G. G. HEGHINIAN.
COIN CONTROL MECHANISM FOR VENDING MACHINES.
APPLICATION FILED DEC. 1, 1911. RENEWED JAN. 29, 1914.
1,267,662.
Patented May 28, 1918.
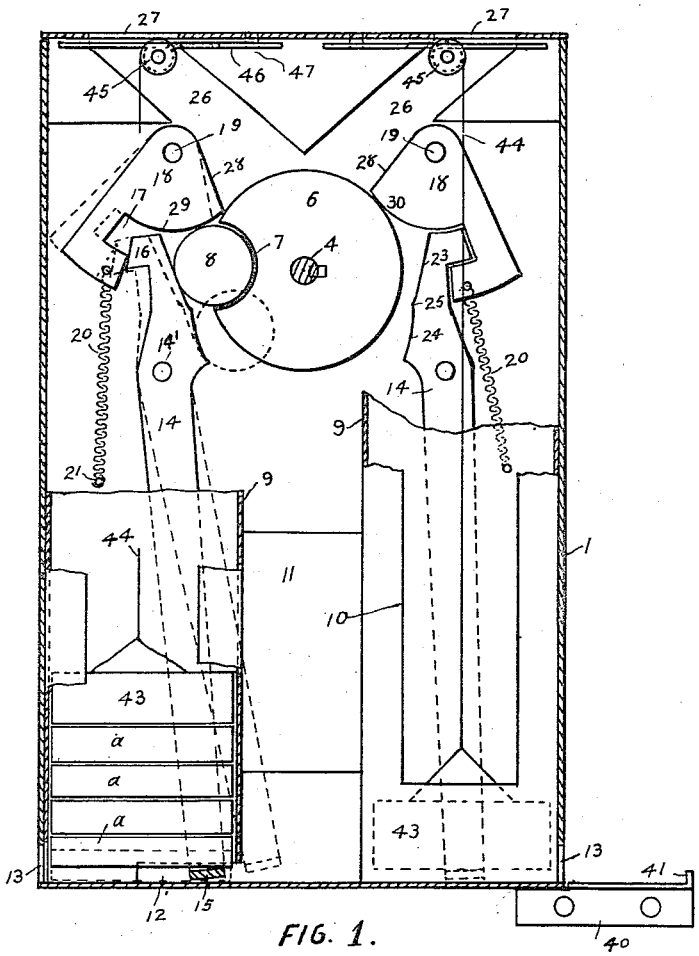
FIG. 1.
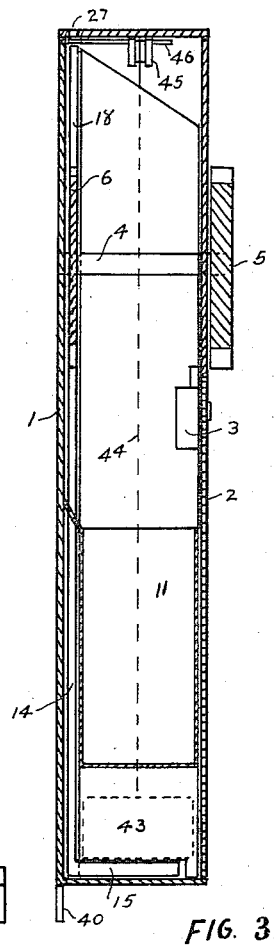
FIG. 3.
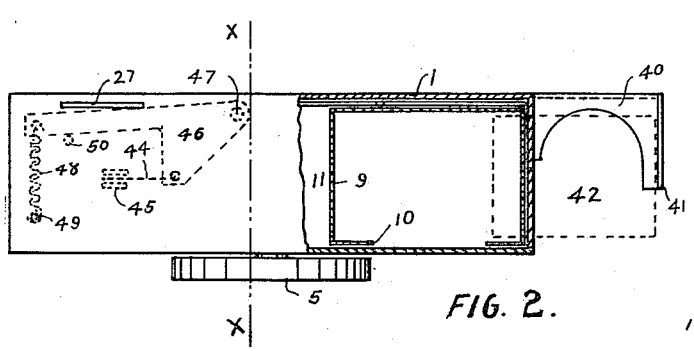
FIG. 2.
FIG. 4.
WITNESSES:
Rose G. Breen.
Philip J. Meahl
INVENTOR.
G. G. Heghinian
BY Oscar F. Gunz
his ATTORNEY.

UNITED STATES PATENT OFFICE.

GARABED GEORGE HEGHINIAN, OF BROOKLYN, NEW YORK.

COIN-CONTROL MECHANISM FOR VENDING-MACHINES.

1,267,662.  Specification of Letters Patent.  Patented May 28, 1918.

Application filed December 1, 1911, Serial No. 663,338. Renewed January 29, 1914. Serial No. 815,290.

*To all whom it may concern:*

Be it known that I, GARABED G. HEGHINIAN, a citizen of the United States, and a resident of borough of Brooklyn, city of New York, in the county of Kings and State of New York, have invented certain new and useful Improvements in Coin-Control Mechanism for Vending-Machines, of which the following is a specification.

This invention relates to new and useful improvements in vending machines and the object of my invention is to provide a new and improved vending machine which is simple in construction, strong, durable, compact, quick and reliable in action and not expensive.

In the accompanying drawings in which like numerals of reference indicate like parts in all the figures:

Figure 1 is a vertical sectional view of my improved vending machine, parts being shown in elevation, and others being broken away.

Fig. 2 is a plan view, parts being broken away and others shown in section.

Fig. 3 is a vertical transverse sectional view of the machine, on the line x—x Fig. 2.

Fig. 4 is a perspective view of the same.

The entire mechanism is contained in a comparatively flat rectangular casing 1 preferably made of sheet iron, one face of which is closed by a removable door 2 provided with a suitable lock 3 of any conventional construction.

A horizontal shaft 4 extends transversely through the casing centrally about one third from the top of the same and is provided on the outer exposed face of the casing with a handle knob 5 for turning it. Within the casing a disk 6 is rigidly mounted on this casing and is provided with an arc shaped notch or recess 7 in its rim for receiving part of a coin 8, for example, one cent. At each side of the casing 1 a vertical chute or hopper 9 for the materials to be delivered is arranged which material, for example, may be cakes of chocolate, or candy, etc., suitably wrapped and preferably rectangular in shape so as to feed freely but without undue play in the hoppers, so that the said cakes of chocolate or other candy can slide down vertically in said hopper. The hopper is preferably bent up of sheet metal as shown in Fig. 1 and is provided with a slot 10 in the face behind the door. Between the hoppers the coin receptacle 11 is located, beneath the shaft 4. A notch or recess 12 is formed in the bottom of each hopper extending from about the middle of the bottom part of the hopper to the innerside of the same and opens into the space beneath the coin receptacle 11. Each hopper is provided at the bottom and the outer side with an opening or slot which communicates with a slot or opening 13 in the bottom of the side wall of the casing 1. Behind each hopper, that is between the rear wall of the hopper and the rear wall of the casing a lever 14 is pivoted at 14' so that it can swing in front of the rear wall of the casing 1, in the direction toward and from the side walls of the casing and each such lever is provided at its lower end with a horizontal arm 15 projecting toward the front of the casing, said arms being normally located in the recess 12 beneath the hoppers. At its upper end, and at the outer edge, each lever 14 is provided with an angular toe 16 which can enter a corresponding notch 17 in the inner edge of a locking lever 18, pivoted at 19 so as to swing in front of the rear wall of the casing, and in the same plane as the lever 14. The lower end of each locking lever is connected with the upper end of a helical spring 20, the lower end of which at 21 is suitably secured to the rear wall of the hopper or the rear wall of the casing so that this spring will act on the locking lever to swing the same downward and in the direction toward the vertical central plane of the casing, that is the plane through the shaft 4. Each lever 14, above the pivot 141, has its inner edge shaped as a cam surface as at 23—24, with a slight offset or beveled shoulder 25 between these cam edges. Coin chutes 26, terminating in slots at 27 in the top of the casing, lead to the disk 6. The levers 14 are normally in the position shown at the right hand side of Fig. 1 and the several cakes of candy or other articles in the corresponding chute rest one upon the other, the lowest one resting upon the arm 15 of the corresponding lever 14. For example, if the coin is inserted in the left hand coin chute, Fig. 1, this coin 8 will pass into the notch 7 as far as possible, when the notch is at the top, and if the notch is not at the top at the time the coin will rest on the edge of the disk 6 until the same has been turned in either direction to such an extent that the coin drops into said notch and will now participate in the turning movement of the disk 6 in the direction from right to left. The coin cannot escape from the notch 7 and acts on the bevel side 28 of the left hand locking lever 18, forces this locking lever against the tension of the spring 20 toward the left hand side of the casing and the coin is carried down to the cam surface 23 at the upper end of the left hand lever 14 and forces the upper end of this corresponding lever 14 some distance to the left thereby swinging the corresponding arm 15 on the lower end of said left hand lever 14 partially from under the lowermost candy or other article in the left hand chute or hopper but not entirely from under the same. This is possible because the locking lever has been moved so far to the left as to permit the angular toe 16 on the upper end of the lever 14 to leave the notch 17 in the locking lever but at the same time the spring 20 has brought the curved edge 29 of the locking lever over the coin, thus preventing turning the shaft in the reverse direction, that is, from left to right, with a view of extracting the coin which shifted the parts to the extent shown. By continued turning of the disk 6 by means of the handle knob 5 in the direction of right to left, Fig. 1, the coin swings the upper end of the lever 14 and the spring actuated locking lever 18 farther to the left, whereby the arm 15 on the lower end of this lever 14 is swung out of the recess 12 as shown in dotted lines, thus permitting all the candies to drop vertically, in the corresponding chute, so that the lowest candy a rests upon the bottom of the casing. Under the action of the turning disk 6 the coin slides to the lower end of the cam edge 24 and then drops into the receptacle 11 thereby releasing the lever 14, and by the action of the spring acting on the locking lever 18 the lever 14 is thrown at its upper end suddenly and forcibly to the right, that is, toward the vertical plane through the shaft 4, and the lower end carrying the arm 15 is thrown suddenly and forcibly to the left and the outer edge of this arm encounters the inner end of the lowermost candy which now rests upon the bottom of the casing and the arm 15 passes into the recess 12 and thereby this lowermost candy is forced by said arm 15 through the slot 13 out of the receptacle. The left hand lever 14 and its locking lever 18 then assume the position shown in full and dotted lines at the right hand side of Fig. 1. The parts are now locked and it is impossible to push the lower end of the lever 14 inward by means of an implement inserted through the slot 13. Even if the notched disk 6 is turned so that the recess 7 in the same is opposite the corner 30 of the locking lever, thus permitting said locking lever to be swung downward at the said point, it is impossible to operate the device by pushing the arm 15 by means of an implement inserted through the slot 13 because the toe 16 at the upper end of the lever 14 is locked in the notch or recess 17 of the locking lever. All the parts are of simple construction and can all be made out of stamped sheet metal.

A bracket 40 may be secured to the bottom of the casing 1 so as to project beyond one side edge and this bracket is provided on its outer edge with an upwardly extending flange 41 and upon this bracket the candy may be delivered. To facilitate removing the candy the bracket may have a notch 42. On the top of the candies a a weight 43 rests which can move down as the candies are successively pushed out at the bottom of the stack. A cord 44 is attached to this weight and passes over a grooved pulley 45 on the underside of the top of the casing and is connected with a locking plate 46 pivoted at 47 to the underside of the top of the box, which lever is connected at its free end by a spring 48 with a pin 49 on the underside of the top of the box, which spring hold one edge of said lever against the stop pin 50. As long as there is candy in any one chute the weight 43 cannot pull down on the cord 44 and thus the spring 48 holds the locking plate 46 away from beneath the coin slots 27 as shown in Fig. 2, but when all the candies have been removed and the corresponding chute is empty the weight 43 can now exert sufficient downward pull on the cord 44 to swing the plate 46 under the coin slots 27 against the tension of the spring 48, thus serving to lock the coin slots 27 and preventing persons inserting coins as long as there is no supply of candies or other articles in the corresponding chute.

Having described my invention what I claim as new and desire to secure by Letters Patent is:—

1. In a vending machine, the combination with a lever adapted to force out goods from a vending machine, of means adapted to receive a coin to operate said lever, and locking means for said lever adapted to lock the coin before the coin completely operates said lever.

2. A vending machine having vertical hoppers adapted to contain goods to be vended combined with means adjacent to and lying in a plane parallel with each hopper to force out the goods from said hopper, and means lying between said forcing out means adapted to receive a coin to operate either forcing out means.

3. In a vending machine, a hopper, a lever of the first class having means to engage goods in said hopper, means adapted to force a coin against said lever to operate the same, and a locking device adapted to maintain said lever in normal posititon to trap said coin before completely locking said lever.

4. In a vending machine, a hopper, a lever of the first class having means to engage goods in said hopper, means adapted to force a coin against said lever to operate the same, and a locking device adapted to maintain said lever in normal position to trap said coin before completely operating said lever and to return said lever to normal position.

5. In a vending machine, a goods container, a goods ejector, means to operate said ejector by a coin, and a locking device adapted to maintain said ejector in normal position and also to trap the operating coin against return before completely operating said ejector.

6. In a vending machine, a goods container, a goods ejector, means to operate said ejector by a coin and a locking device adapted to maintain said ejector in normal position and also to return said ejector to normal position, and means tending to maintain said locking device in normal position.

7. In a vending machine, a goods container, a goods ejector, means to operate said ejector by a coin, a locking device adapted to maintain said ejector in normal position, to return the said ejector to normal position, and also to trap the operating coin against return before the coin completely operates the said ejector, and means tending to maintain said locking device in normal position.

8. In a vending machine, a goods container, means to eject goods from said container, means to operate said first-named means by a coin, and a spring-pressed locking member adapted to maintain said first-named means in normal position and also to return said first-named means to normal position after being operated.

9. In a vending machine, a goods container, means to eject the goods from said container, means to operate said first-named means by a coin, and a spring-pressed locking member adapted to return said first-named means to normal position after being operated and also to trap the operating coin against return before the coin completely operates said first named means.

10. In a vending machine, a goods container, means to eject goods from said container, means to operate said first-named means by a coin, and a spring-pressed locking member adapted to maintain said first-named means in normal position, to trap the operating coin against return before the coin completely operates said first-named means and also to return said first-named means to normal position after being operated.

11. In a vending machine, a hopper, a lever to eject goods from said hopper, means adapted to lock said lever, to trap the operating coin, and to return said lever to normal position after operation, comprising a single member, and means tending to maintain said first-named member in normal position.

12. In a vending machine, a hopper, a lever to eject goods from said hopper, means adapted to lock said lever to trap the operating coin and return said lever to normal position after operation, comprising a single member, said lever and said member lying in the same plane, and means tending to maintain said first-named member in normal position.

Signed at New York city, in the county of New York, and State of New York, this 23rd day of November, A. D. 1911.

GARABED GEORGE HEGHINIAN.

Witnesses:
ROSE G. BREEN,
M. E. McNINCH.